Feb. 15, 1944.  E. W. STEVENS  2,342,020
SPRING BALANCER
Filed June 27, 1939  5 Sheets-Sheet 4

INVENTOR
Edward W. Stevens.
BY
Raymond G. Mullee
ATTORNEY

Patented Feb. 15, 1944

2,342,020

UNITED STATES PATENT OFFICE 2,342,020

SPRING BALANCER

Edward W. Stevens, Detroit, Mich., assignor to Chicago Pneumatic Tool Company, New York, N. Y., a corporation of New Jersey Application June 27, 1939, Serial No. 281,370

25 Claims. (Cl. 242—109)

This invention relates generally to weight balancing devices of the spring conterbalancing type and more particularly to certain improvements in spring retainers and automatic locking mechanisms used in such devices.

The improvements of the present invention are disclosed as embodied in a counterbalancer of the kind most commonly used in the suspension of a pneumatic tool, or like article, from an overhead support. The function of the balancer is to equalize the pull of gravity upon the suspended tool or other load to permit a greater ease of manipulation of the tool and to facilitate its movement to and from working position. The mode of operation of the usual balancer and the essential elements comprised therein are well known to those skilled in the art. Included in these elements is a rotatable drum or reel, upon which the suspension cable is wound, and a coil spring which tensions the drum in a direction opposite to that in which it must turn to pay out the cable. Also, a means is customarily provided for adjusting the spring to an initial tension which is sufficient to balance the suspended load in one position. A particular difficulty encountered in assembling and disassembling the majority of balancers used heretofore is the handling of the coil spring. In the usual balancer the spring is inserted in a container formed integrally with the frame work of the balancer or, in some cases, is positioned in the drum itself. Apart from the well recognized fact that handling of a heavy coiled spring is always a hazardous undertaking, the insertion and removal of a spring so positioned has another disadvantage in that it necessitates at least a partial disassembly of the balancer. It is not an uncommon occurrence for a spring to break while in use. When such breakage occurs the balancer is out of use for the rather considerable time necessary for a mechanic to replace the broken spring with a new one.

It was with the object in mind of simplifying the handling, insertion and removal of a balancer spring that the present spring retainer has been developed. This retainer consists of a ring which encloses the spring and which forms, in combination with the spring, a unitary spring assembly. The spring and its retainer are shipped and stored as an assembly and are mounted on the balancer in the same manner. The present balancer is so constructed as to provide a mounting for the spring assembly which is entirely independent of the cable drum and which renders the assembly easily accessible for replacement. It is unnecessary to dissassemble the balancer mechanism even partially when inserting or removing the present spring assembly, nor is it necessary to remove the balancer from its support or detach the suspended load at this time. The construction of the spring retainer is thought to present a particularly novel and desirable feature in that its inner surface is formed with a plurality of individual contact points so that the spring is engaged only by these several points and is spaced a short distance away from the main surface of the retainer. Such an arrangement greatly facilitates the removal of a broken spring from the retainer since the several coils of the spring may more easily be clamped together before the spring is removed.

The improved locking machanism, which also forms a part of this invention, has the character of a plurality of separate means capable of acting individually upon a single locking element to stop rotation of the cable drum. One of these separate means is manually operated. A second acts under the control of the coil spring to operate the locking element upon a full or uncontrolled expansion of the spring caused by breakage or complete untensioning. A third means comprises a Geneva gear actuated by an element movable with the cable drum and operable to move the locking element to effective position at a predetermined point in the travel of the drum in either direction. That is, by the use of the Geneva gear, a definite range of movement of the cable drum is set. The number of drum revolutions comprised in the range of movement is, of course, determined by the construction of the Geneva gear, and the range may be increased or decreased at will by the use of gears of varying construction.

This improved locking mechanism is directed to the several ends of enlarging the scope of usefulness of the balancer, of simplifying its construction and operation and of eliminating a hazard which enters into the use of all spring counterbalancers.

The broad object of this invention is to produce a spring counterbalancer having the improved construction discussed above.

More specifically, an object of the invention is to simplify the mounting of a counterbalancing spring to render it more readily accessible for purposes of replacement.

Another object of the invention is to enclose the spring in a retainer of novel construction to form thereby a spring assembly which may be shipped, stored and mounted on the balancer as a unitary element.

Another object is to control a cable drum locking element from a plurality of sources in order that the drum may be locked manually by one means, automatically by another means in the event of a broken spring, and automatically by still another means to limit the range of movement of the drum.

Other objects and structural features of the invention will be more apparent from the following detailed description, when read in connection with the accompanying drawings wherein.

Figure 1:
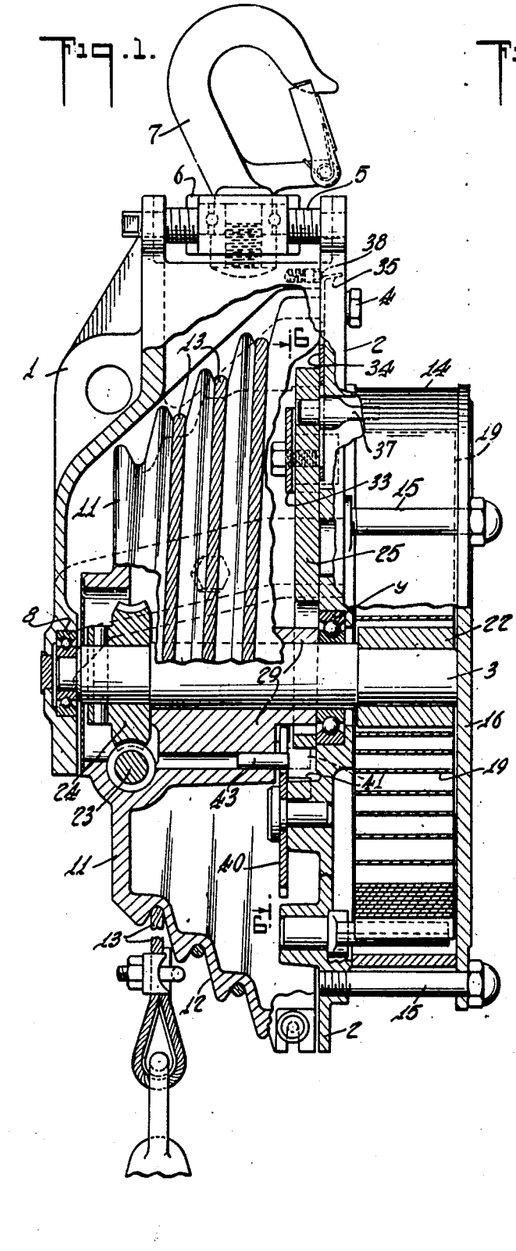
Fig. 1 is a side view, partly in elevation and partly in section, of a balancer embodying the invention.
Figure 2:
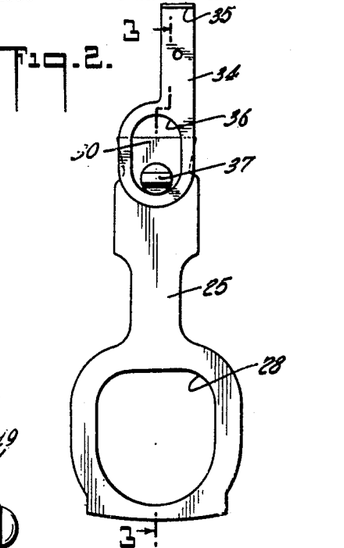
Fig. 2 is a detailed view, in front elevation, of the cable drum locking element and the manual means for operating it.
Figure 3:
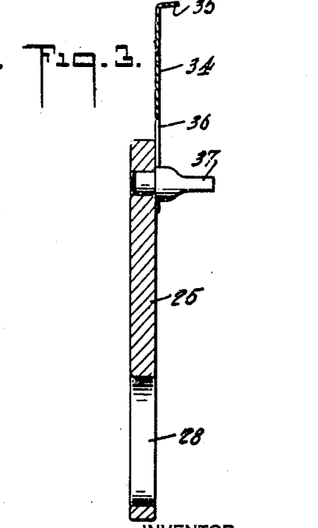
Fig. 3 is a sectional view taken along the broken line 3—3 of Fig. 2.
Figure 4:
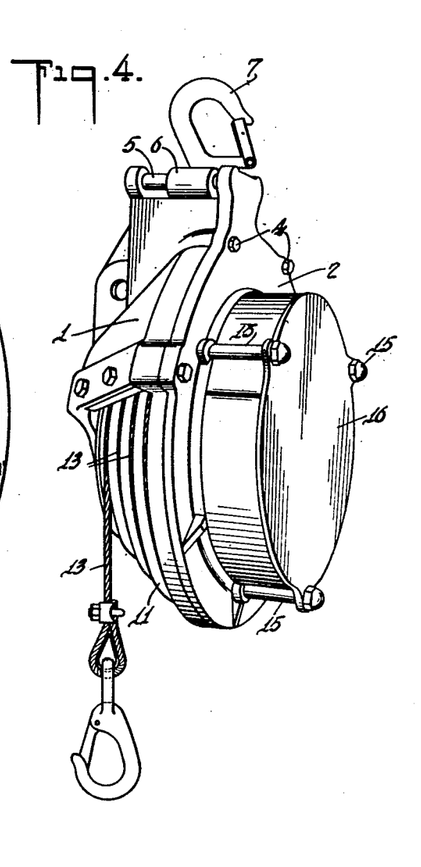
Fig. 4 is a perspective view of the present balancer on a reduced scale.

Referring first to Figs. 1 and 4, it will be seen that the principal supporting elements of the balancer are an outer housing 1, a central bracket 2 and a shaft 3 (Fig. 1). The housing 1 and bracket 2 are rigidly secured together by screws 4 (Fig. 4) and by tie rods 5 which serve the additional function of supporting a ball bearing socket 6 in which is mounted the usual swivel hook 7 by which the balancer is connected to an overhead support. As shown in Fig. 1, bearings 8 and 9 of the usual ball type are supported within recesses in the housing 1 and bracket 2 respectively and support the shaft 3 for rotary movement relative to the housing and bracket, the left end of shaft 3 being reduced in diameter to fit bearing 8.

Adjustably secured to the shaft 3, between the housing 1 and bracket 2, is the cable drum 11. This drum is generally similar to the drum disclosed in the patent to W. H. Benedict, No. 1,794,825, issued March 3, 1931. The drum is preferably constructed as a single piece, is generally conical in shape and formed in its outer surface is a spiraled groove 12 which guides the cable 13.

The spring retainer 14 which forms a part of the spring assembly, is shown in Fig. 1 as positioned to the right of the central bracket 2 and supported by a plurality of posts 15 set in the bracket and projecting laterally therefrom. In the device shown there are three such posts 15, spaced equal distances apart and positioned near the rim of the bracket (see Fig. 4). The retainer consists primarily of a retaining element in the form of a simple ring which can be placed inside the posts 15 and held flush against the bracket 2 by a cover 16 bolted to the posts 15. The retainer shown in the drawings, however, has, in addition to the ring 14, an inner lining strip 17 (see Figs. 8 and 9) fixed to the inner surface of the ring and bent inward, at spaced intervals, to provide a series of contact points 18 in the form of semi-loops. A coil spring 19 is mounted within the retainer. When the spring 19 is in completely expanded position, the outer coil thereof engages merely the several contact points 18, and is spaced a short distance away from the relatively flat portion of the strip 17 and from the ring 14. A spring retainer using a series of discrete contact points has many advantages not present in a retainer wherein the spring presses directly upon the inner surface of the retaining ring. Among these advantages is the greater ease and safety with which the spring may be inserted in the retainer and removed therefrom. Another advantage lies in the fact that undesirable friction between the spring and the retainer is reduced to a minimum. With further regard to the construction of the spring retainer, it will be apparent that the lining strip 17 is used here merely as a mechanical expedient since the ring 14 could itself be quite easily formed with contact points 18 and a retainer of one piece construction thus produced.

Considering now the manner of tensioning the spring 19, it will be observed that the outer end of the spring is fixed to an anchor post 21 set in the fixed bracket 2. The inner end of the spring engages a groove cut in a collar 22 surrounding the right-hand or outer end of the shaft 3 which, as is shown in Fig. 1, extends through and beyond the bracket 2. The outer end of the shaft 3 and the inner surface of the collar 22 are substantially oval in shape, the arrangement being such that the collar is forced to rotate with the shaft but may be moved relatively thereto in a longitudinal direction during assembly or disassembly. It will thus be seen that movement of the shaft 3 in a counterclockwise direction, as viewed in Figs. 8 and 9, will wind or tension the spring 19, the amount of tension depending on the position of the shaft 3 relative to the fixed housing 1. As is well known in the art, a preliminary to the operation of a spring balancer is the setting of the spring to a minimum or "initial tension," which tension is of course determined by the weight of the article intended to be balanced or suspended. This setting of the spring is done by hand and is accomplished, in the present instance, by turning the shaft 3 relative to drum 11 while the latter is held immovable at the extreme limit of its cable winding movement. The adjustment is effected by a worm 23 (Fig. 1) which engages a worm gear 24 fast on the shaft 3 near its lefthand end. The worm 23 is positioned in a channel in the cable drum 11 and has, on its outer end, a head (not shown) which may be engaged by a crank to rotate the worm, the gear 24, and the shaft 3 to tension the spring 19 the desired minimum amount. The worm cannot, of course, be turned by the worm gear so that although the spring tension may be increased by rotation of the cable drum in the load lowering direction, it cannot be reduced below the initial amount except by manual rotation of the crank, or upon breakage of the spring.

As the drum 11 rotates, therefore, to pay out the cable 13 and lower the suspended article, it carries shaft 3 in unison therewith in a counter-clockwise direction (Fig. 8), and further tensions the spring 19. An approximately uniform balancing force is maintained notwithstanding the increasing tension of the spring, by reason of the progressively greater leverage afforded by the gradually increasing diameter of the cable groove 12. This subject of balance and balance range is considered in greater detail in the previously mentioned patent to Benedict. Return of the cable drum to normal will, of course, unwind the spring to its initial tension.

Figure 5:
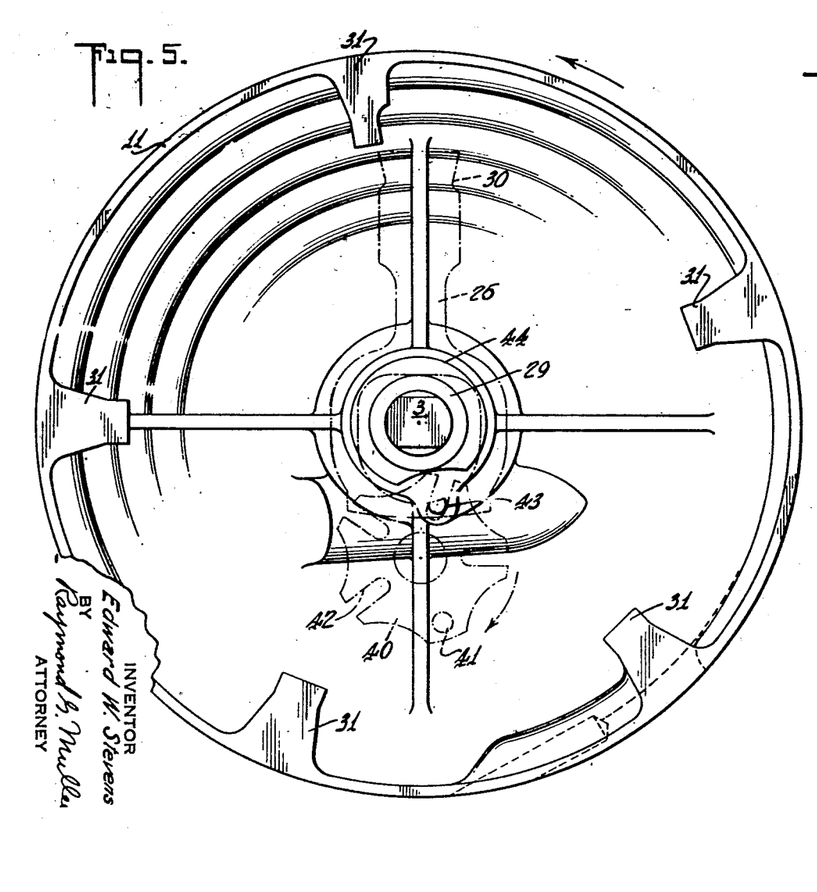
Fig. 5 is a view in elevation of the inside of the cable drum and shows a portion of the locking mechanism in dot-dash outline.
Figures 6, 7:
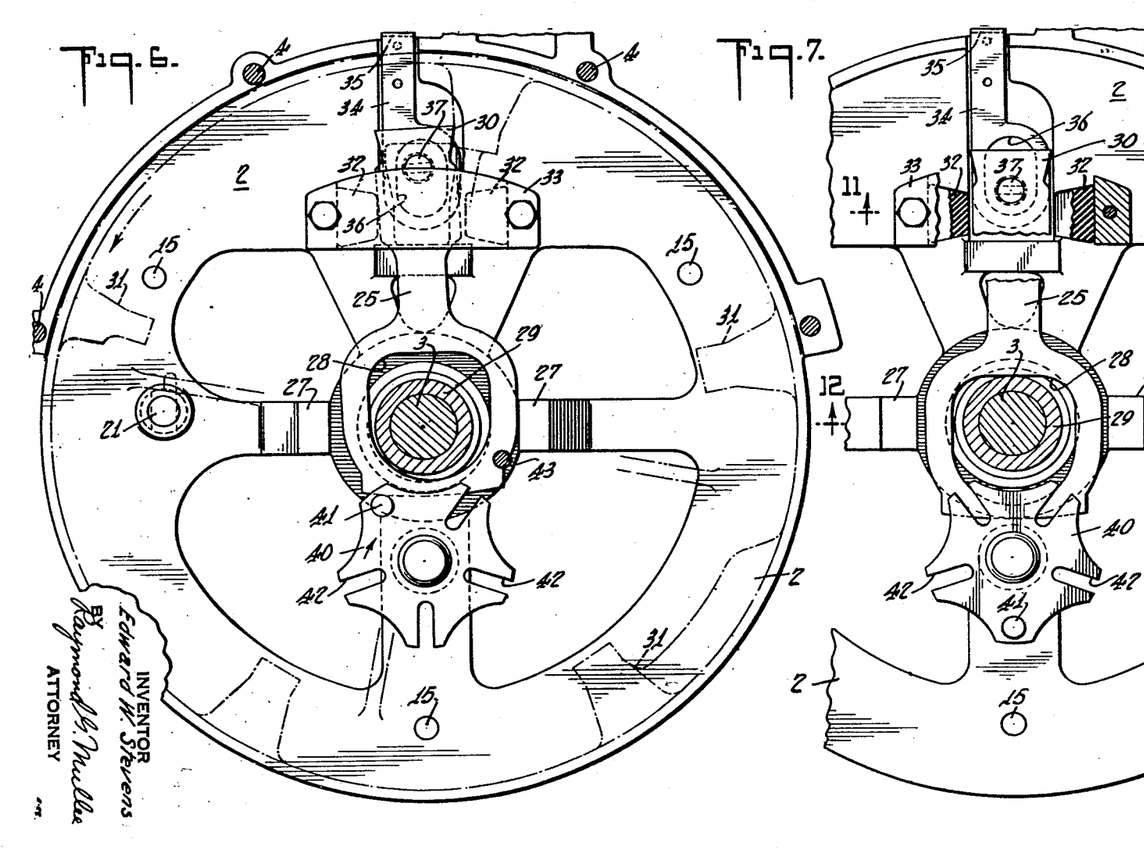
Fig. 6 is a view taken along the line 6—6 of Fig. 1 and shows a supporting bracket and the manner in which the locking mechanism of the invention is mounted thereon.
Fig. 7 is a detailed view, in elevation, of the locking mechanism looking in the same direction as in Fig. 6.
Figure 11:
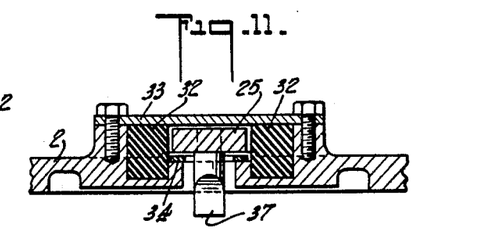
Fig. 11 is a sectional view taken along the line 11—11 of Fig. 7.
Figure 12:
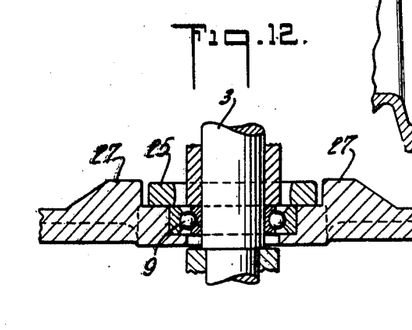
Fig. 12 is a sectional view taken along the line 12—12 of Fig. 7.

This invention includes positive means for limiting the extent of movement of the cable drum in either direction, and also means arranged to lock the drum in the event of a broken spring. The first of the means is a very useful adjunct in the operation of a balancer since by its use, an exact range of movement of the suspended weight may be set and the likelihood of damage to the mechanism, especially the spring and the cable, is reduced. The desirability of a safety lock is apparent. A weight falling as a result of a broken spring may cause serious personal injury or property damage. The device of the present invention embodies locking mechanism of an improved character which is subject to both manual and automatic operation. A novel feature of the locking mechanism lies in the fact that a single latch or stop member is provided which may be operated by any one of three different mediums. The latch 25 (Figs. 1, 2, 3, 5, 6 and 7) is slidably mounted upon the inside face of the fixed bracket 2 and is guided for vertical movement by a pair of shoulders 27 (see Fig. 12) also formed on the bracket 2. A generally circular opening 28 is cut in the lower end of the latch 25 to receive shaft 3 and a hub portion 29 on drum 11. The hub forms a seat for the latch 25 in its normal position (Fig. 7). The upper end of the latch is formed with an engaging nose 30 adapted, when the latch is raised, to be interposed into the path of any one of a plurality of projections or abutments 31 formed on the inside surface of the cable drum 11. The latch normally stands in the position shown in Fig. 5, in which position the nose 30 stands out of the path of the projections 31 and the drum is free to rotate in either direction. It will be evident, however, that when the latch is raised to its Fig. 6 position the nose 30 thereof will, as the drum moves, be engaged by one of the projections 31 and so arrest the drum from further movement in the direction in which it was travelling. Also, it can only move in the opposite direction a sufficient distance to bring the next abutment 31 into contact with the nose of the latch. The contacting of the latch 25 by a projection 31 is usually an impact of considerable force. To absorb the shock of this blow a cushion, made preferably of rubber, or rubber substitute, is placed on either side of the latch 25 near its upper end. These cushions 32, as shown in Fig. 11, are positioned in respective recesses in the bracket 2 and are held in place by a plate 33 bolted to the bracket 2. The plate 33 serves the additional purpose of preventing the latch from slipping out of its proper position between the shock absorbers, and cooperates with the latter to guide the latch.

Figure 13:
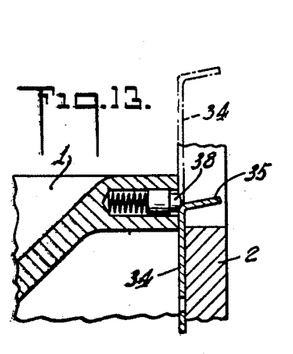
Fig. 13 is a detailed view, in section, of a detent means associated with the manually operated lock control.

It should now be clear that anything which raises the latch 25 will lock the cable drum 11 against rotation in one direction and limit its extent of rotation in the opposite direction to a fractional part of a turn. One means for raising the latch is a manually operable link 34 (Figs. 2, 3 and 7) mounted on the inner face of the bracket 2 adjacent the latch 25. The upper end of the link 34 is bent over to form an ear 35 which lies above the periphery of the bracket 2 in such position that it may be grasped manually to be raised and lowered. The lower end of the link 34 is formed with an opening 36 through which extends a stud 37 mounted in the upper end of the latch 25. In the normal position of the latch 25 the stud 37 thereon lies in the lower portion of the opening 36 so that the latch may be raised independently of the link 34, but the link, when raised, will always elevate the latch. As shown in Figs. 1 and 13, a spring-pressed detent 38 is mounted in the housing 1 and cooperates with the link 34 to retain it yieldably in either its raised or lowered position, by engagement either with a hole in the link 34 or with a bent portion thereof. The manually operable link 34 presents a means whereby the cable drum may be locked in any desired position when the article suspended is to be used for an extended period at one level.

Figure 8:
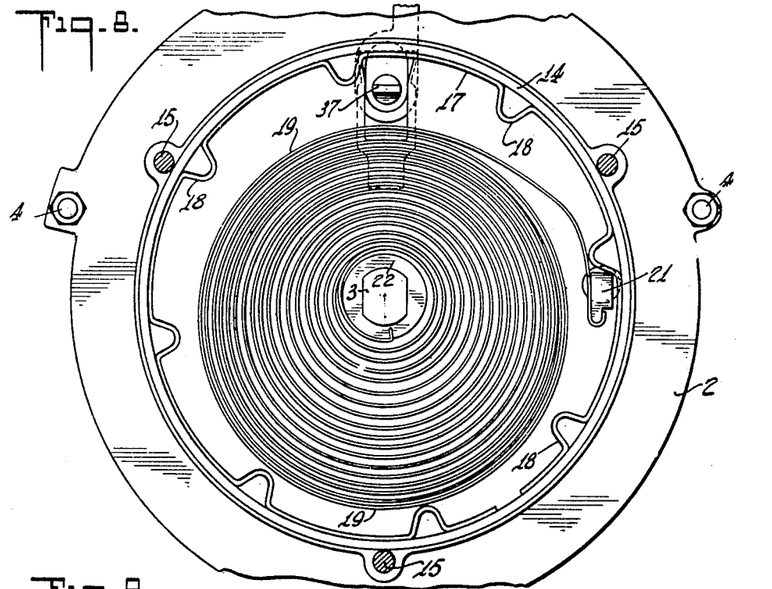
Figs. 8 and 9 are views, in elevation, of the spring assembly as mounted upon the balancer, Fig. 8 showing the condition of the spring when wound to its initial tension, and Fig. 9 the condition of the spring when broken.
Figure 9:
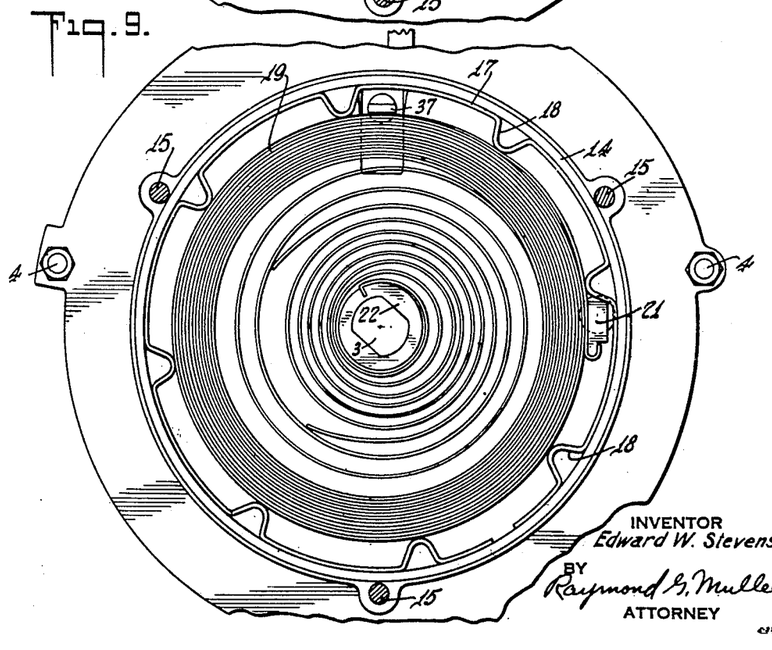
Figure 10:
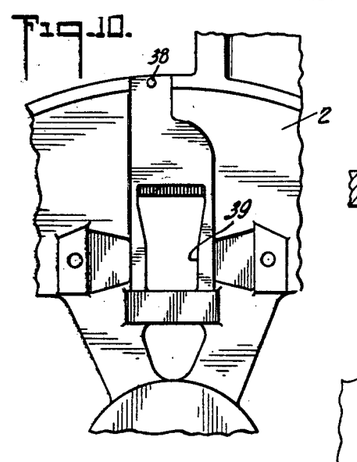
Fig. 10 is a detailed view, in elevation, of a cushioning means associated with the locking element.

A means is also provided for raising the latch 25 automatically in the event of breakage of a spring. Referring now to Figs. 1, 8 and 9, it will be seen that the stud 37 on the latch 25 extends not only through the opening in link 34 but also through an opening 39 (Fig. 10) in the bracket 2 and into the area surrounded by the ring 14 of the spring retainer. The position of the stud 37 in the retainer is between the outer coil of the spring 19 and the lining strip 17. When the spring 19 is wound to its initial tension it may be set to the condition illustrated in Fig. 8. In any case the initial winding of the spring will cause it to contract and shift away from certain of the contact points 18 including the one nearest the stud 37. Accordingly, when the spring has been so wound, the latch 25 and its stud 37 are permitted to drop downward and assume their normal position shown in Fig. 8. In this position the stud 37 rests at a point just inside the circle represented by the tips of the contact points 18. During the operation of the balancer, the spring 19 winds and unwinds from and to its initial position (Fig. 8) without contacting the stud 37. If, however, during the course of this operation the spring 19 should break, it would immediately expand to the position shown in Fig. 9, and, in the course of such expansion, would engage the stud 37 and force it and the latch 25 upward to stop the drum in the manner previously described.

The third means for raising the locking element or latch 25 acts positively at certain extremes of movement of the cable drum. As shown particularly in Figs. 1, 6 and 7, a Geneva gear 40 is pivoted to a boss on the bracket 2, and lies in the next adjacent plane to the sliding latch 25 and carries a stud 41 adapted to engage the latch, at its lower edge, and raise it to locking position. The Geneva gear is of the usual kind in that its periphery is formed with a series of uniformly spaced, radially extending slots 42 adapted to be engaged seriatim by a single actuating element to turn the gear one step at a time. In the present instance the actuating element is a pin 43 mounted on the hub 29 of the cable drum 11 (see also Fig. 5). The hub 29 is cut away at the point where pin 43 is mounted in order to permit movement of the Geneva gear. It will be noted, in this connection, that when the full circular portion 44 of hub 29 is presented to the Geneva gear, the gear is locked against rotation. The manner of operation of this mechanism is evident. Once for each revolution of the drum 11, the pin 43 engages a slot 42 in the Geneva gear and turns the gear one step in a direction opposite to that in which the drum is moving. The Geneva shown is formed with positions for five slots 42. There are only four such slots cut in the gear, however, the fifth position being taken by the stud 41.

It may be assumed that the parts are arranged in Fig. 6 in accordance with the position they occupy with the cable drum at normal or no-load position and the spring 19 would only to its starting tension, the spring tending to turn the drum and Geneva gear in the direction indicated by the respective arrows in Fig. 6. At this time the stud 41 is holding the locking element or latch 25 in locking position and the drum is locked against further rotation in a load raising direction. Now, as the drum and associated pin 43 revolve clockwise (Fig. 6) to pay out the cable, the Geneva will be turned step-by-step in a counter-clockwise direction and upon its fourth step the stud 41 will again contact and raise the pawl 25. As the cable drum returns to normal, the direction of motion of the Geneva is reversed but it acts in the same manner as before and finally returns to the Fig. 6 position. It will be understood, of course, that as the stud 41 moves away from the latch 25, the latch immediately drops by gravity out of engaging position and rests upon the hub 29. The first turn of the Geneva takes place near the start of the first revolution of the drum so that the locking pawl is withdrawn in ample time to permit passage of the first projection 31.

The Geneva gear thus operates upon its fourth step to elevate the locking element. Approximately three and one third revolutions of the cable drum are required to move the gear through the four steps. Accordingly this number of revolutions represents the range of movement of the drum. It will be evident, however, that this range of movement may be varied without departure from the inventive principle disclosed. For example, a Geneva requiring a greater number of actuations, than four, to become effective could be used to increase the range. Similarly, the range could be decreased by fitting the Geneva with another stud 41, or by providing a plurality of actuating elements 43 spaced apart on the drum.

Figure 14:
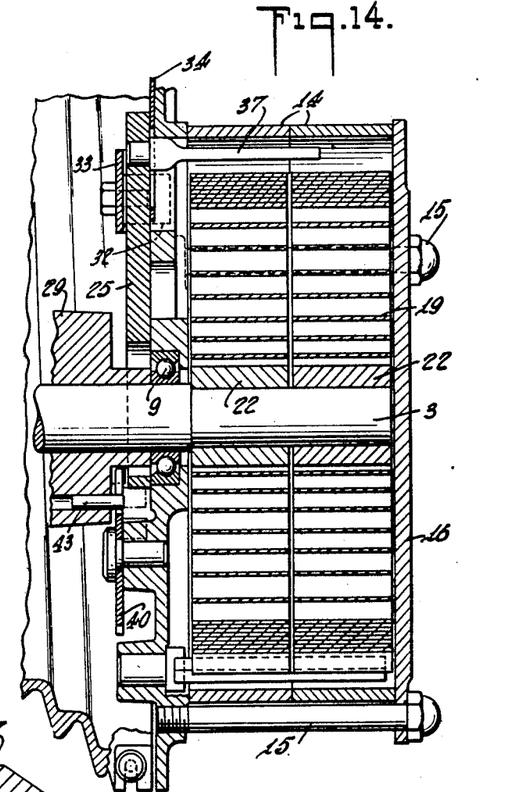
Fig. 14 is a sectional view showing a portion of the balancer as modified for use with two spring assemblies.

An important feature of the present balancer is the ease with which it may be adapted for use with a plurality of spring assemblies. In Fig. 14 is shown a section of a balancer modified by having two springs 19 enclosed by separate spring retainers 14. To accommodate the additional spring retainer it is merely necessary to lengthen the shaft 3, supporting posts 15 and latch stud 37. In this construction the stud 37 overlies both springs 19 and breakage of either will elevate the locking pawl. It will be noted that each retaining ring is of slightly greater width than the spring which it encloses. This construction renders the handling of a spring assembly easier and safer and serves a particular function in that it prevents contact of one spring with another and prevents contact of a spring with the bracket 2 or cover 16.

The spring retainer apparatus, including ring 14 and lining strip 17, form the subject matter of divisional application Serial No. 514,342, filed December 15, 1943.

What is claimed is:

1. In a device of the class described, the combination of a rotatable drum, a spring assembly including a coil spring arranged to rotate said drum and a retaining element for said spring, a locking element supported independently of said drum and adapted to be interposed into the path of said drum to stop rotation thereof, and means operable by said spring for moving said locking element to interposed position, said means comprising a stud carried by said locking element extending into the area enclosed by said spring retainer and positioned between the wall of said retainer and the outer coil of said spring in such wise that a full expansion of the spring caused by breakage or complete untensioning will result in an operation of the stud and the locking element.

2. In a device of the class described, the combination of a rotatable drum, a spring assembly including a coil spring arranged to rotate said drum in one direction and a spring retainer formed with a plurality of contact points extending inward toward the axis of the spring, a locking element supported independently of said drum and adapted to be interposed into the path of said drum to stop rotation thereof, and means operable by said spring for moving said locking element to interposed position, said means comprising a stud carried by said locking element extending into the area enclosed by said spring retainer and positioned inside the circle represented by the tips of the contact points of the retainer in such wise that a full expansion of the spring caused by breakage or complete untensioning will result in an operation of the stud and the locking element.

3. In a device of the class described, the combination of a rotatable drum, a plurality of spring assemblies each including a coil spring arranged to rotate said drum and a spring retainer, a locking element cooperable with said drum and adapted when operated to stop rotation of said drum, and means operable by said springs for operating said locking element, said means comprising a stud carried by said locking element extending into the area enclosed by each of said spring retainers and positioned between the wall of each retainer and the outer coil of its respective spring in such wise that a full expansion of one or more springs caused by breakage or complete untensioning will result in an operation of the stud and the locking element.

4. In a device of the class described, the combination of a rotatable drum; a spring assembly including a coil spring arranged to rotate said drum; a locking element cooperable with said drum and adapted when operated to stop rotation of said drum; and three independent means for operating said locking element, one of said means acting under the control of said coil spring to operate said locking element upon a full or uncontrolled expansion of said spring, the second of said means acting under the control of said rotatable drum to operate said locking element after a predetermined number of revolutions of said drum in either direction, and the third said means acting under manual control to permit permanent retention of the drum at any point in its range of movement.

5. In a device of the class described, the combination of a rotatable drum; a spring assembly including a coil spring arranged to rotate said drum; a locking element cooperable with said drum and adapted when operated to stop rotation of said drum; and two independent means for operating said locking element automatically; one of said means acting under the control of said coil spring to operate said locking element upon a full or uncontrolled expansion of said spring, and the second of said means acting under the control of said rotatable drum to operate said locking element after a predetermined number of revolutions of said drum in either direction.

6. A spring balancer comprising a relatively stationary bracket capable of being suspended, a rotatable cable drum associated therewith and having a plurality of circumferentially spaced abutments, a locking element mounted for sliding movement on said bracket into and out of the path of said abutments, and means controlled by said drum and operable automatically upon completion of a predetermined number of rotations thereof for moving the locking element.

7. A spring balancer, comprising a relatively stationary support, motor elements supported thereby and including a rotatable drum and a coil spring therefor, and a single means subject to operation by said drum and also by said spring for limiting rotation of said drum.

8. A spring balancer according to claim 7, characterized in that said means for limiting rotation of said drum includes a locking element mounted on said stationary support and movable into and out of cooperative relation with said drum.

9. A spring balancer, comprising a relatively stationary support, motor elements supported thereby and including a rotatable drum and a coil spring therefor, a locking element movable into and out of cooperative relation with said drum to limit rotation thereof, means operated by said drum for moving said locking element into cooperative relation with said drum, and independent means operated by said spring for moving said locking element into cooperative relation with said drum.

10. A spring balancer, comprising a relatively stationary support, motor elements supported thereby and including a rotatable drum and a coil spring therefor, said drum and said spring being positioned on opposite sides of said support on the side adjacent said drum and movable into and out of cooperative relation with said drum and operable by said drum, and means carried by said element and extending through said support into the path of expansion of said coil spring and operable by said spring to effect movement of said element into cooperative relation with said drum.

11. A spring balancer, comprising a relatively stationary support, motor elements supported thereby and including a rotatable drum and a coil spring therefor, said drum and said spring being mounted on opposite sides of said support, a shaft extending transversely through said support and connecting said drum and said spring, and a locking element operable alternatively by said drum and said spring and mounted on said support for movement transverse to the longitudinal axis of said shaft into and out of cooperative relation with said drum to limit rotation of said drum.

12. A spring balancer according to claim 11, characterized in that said locking element is mounted on said support for substantially vertical relative sliding movement and normally occupies by the force of gravity a position out of cooperative relation with said drum.

13. A spring balancer, comprising a relatively stationary support, motor elements supported thereby and including a rotatable drum and a coil spring therefor, said drum and said spring being positioned on opposite sides of said support, a locking element mounted on said support on the side adjacent said drum and movable into and out of cooperative relation with said drum to limit rotation thereof, and means carried by said locking element and extending through said support into the path of expansion of said coil spring and operable by said spring for effecting movement of said element into cooperative relation with said drum.

14. A spring balancer, comprising a relatively stationary support, motor elements supported thereby and including a rotatable drum, means for limiting rotation of said drum including a locking element surrounded by said drum and slidably mounted on said support for movement transverse to the longitudinal axis thereof into and out of cooperaitve relation with said drum, and means having a step-by-step motion imparted thereto by said drum for moving said locking element into cooperative relation with said drum.

15. A spring balancer according to claim 14, characterized in that said step-by-step means comprises a Geneva gear intermittently engaged with said drum and driven thereby through a predetermined extent of movement during each cycle of rotation of said drum.

16. A spring balancer, comprising a rotatable drum, circumferential abutments on said drum, a locking element adapted selectively to be interposed into the path of one or another of said abutments to stop rotation of said drum, and means having a step-by-step motion imparted thereto by said drum for effecting movement of said element into the path of said abutments.

17. A spring balancer, comprising a relatively stationary support, motor elements supported thereby and including a rotatable drum, means for limiting rotation of said drum including a locking element mounted on said support and movable into and out of cooperative relation with said drum, a Geneva gear rotatably mounted on said support and adapted when turned a predetermined extent in either direction to move said locking element into cooperative relation with said drum, and actuating means on said drum engageable with said Geneva gear to effect rotation thereof and movable into and out of engagement with said gear by the rotation of said drum.

18. A spring balancer, comprising a relatively fixed support, motor elements supported thereby and including a rotatable drum and a coil spring therefor, a locking element slidably mounted on said fixed support for movement into and out of engagement with said drum to limit rotation thereof, and means on said locking element and extending into the path of expansion of said coil spring and operable thereby for effecting movement of said element into engagement with said drum.

19. A spring balancer, comprising a relatively fixed support, motor elements supported thereby and including a rotatable drum and a coil spring therefor, said support, said drum and said spring being disposed about a common longitudinal axis, a locking element slidably mounted on said fixed support for movement transverse to the longitudinal axis thereof into and out of engagement with said drum to limit rotation of said drum, and a stud on said locking element extending at right angles therefrom into the path of expansion of said spring and operable thereby to effect movement of said element into engagement with said drum.

20. A spring balancer, comprising a rotatable drum, a spring assembly including a plurality of axially aligned coil springs arranged to rotate said drum, a locking element supported independently of said drum and adapted to be interposed into the path of said drum to stop rotation thereof, and an operating stud on said locking element extending in a direction parallel to the axes of said coil springs and overlying the outer coils thereof in such wise that expansion of any one of said springs beyond a predetermined limit will effect movement of said locking element to interposed position.

21. A spring balancer comprising a housing adapted to be suspended, a cable drum supported therein and thereby for rotation about a horizontal axis, a spring retainer secured to the housing, a spiral spring mounted in the retainer, the inner end of the spring having a separable driving connection with the drum and the outer end being anchored to the retainer, and means for winding one end of the spring while the other end of the spring and the drum are held stationary with respect to the housing to adjust the initial tension of the spring, said spring and retainer being removable as a unit from the housing without requiring the removal of the drum from the housing.

22. A spring balancer comprising a main housing adapted to be suspended, and having a vertical wall, a bracket detachably secured to the housing and providing a vertical wall spaced from and parallel to the wall first mentioned, a horizontal shaft supported by said walls, a cable drum coaxial with said shaft and mounted for rotation between the vertical walls of said housing and said bracket, a spring retainer detachably secured to said bracket on the side opposite the drum, a spiral spring mounted in said retainer, the ends of the spring establishing a driving connection between the cable drum and housing, said spring and retainer being removable from the bracket for replacement without requiring removal of the cable drum from the housing or bracket, and means for automatically locking the cable drum upon breakage of the spring, said locking means comprising a bolt located within the main housing and movable into locking engagement with the cable drum, and an operating element connected to the bolt and extending through an opening in the bracket and into the path of the spring.

23. A spring balancer, comprising a cable drum and a coil spring therefor, a rotatable shaft surrounded by said drum and said spring, means for connecting the inner end of said spring to said shaft, means for anchoring the outer end of said spring, a worm and gear connecting said drum to said shaft and acting normally to lock said drum and said shaft for rotation as a unit, said spring being thereby wound and unwound by said shaft in response to the turning of said cable drum, and means for turning said worm to rotate said shaft relatively to said drum and thereby adjust the tension of said spring independently of said drum.

24. A spring balancer, comprising a central supporting bracket, a shaft extending therethrough, a cable drum secured to said shaft for rotation therewith on one side of said bracket, a coil spring surrounding said shaft on the opposite side of said bracket, means for connecting the inner end of said spring to said shaft, means for anchoring the outer end of said spring, said spring being thereby wound and unwound by said shaft in response to rotation of said drum, and a safety lock operable by said spring upon breakage thereof to stop rotation of said drum.

25. A spring balancer comprising a main housing adapted to be suspended and having a vertical wall, a bracket detachably secured to the housing and providing a vertical wall spaced from and parallel to the wall first mentioned, rolling bearings in said walls, a shaft rotatably mounted in said bearings and having a free end projecting beyond the bracket, a cable drum secured to said shaft aand mounted thereon between said walls, a collar detachably mounted on the projecting end of the shaft, a spring secured at its inner end to the collar, a retainer surrounding the spring and secured to the outer end thereof, manipulative adjusting means for turning the drum relative to said shaft whereby to place the spring under adjustable, initial tension, said collar, spring and retainer being removable as a unit with respect to said shaft while the shaft, cable drum, main housing and bracket remain in assembled relation and while the spring remains under tension.

EDWARD W. STEVENS.

CERTIFICATE OF CORRECTION.

Patent No. 2,342,020.  February 15, 1944.

EDWARD W. STEVENS.

It is hereby certified that error appears in the printed specification of the above numbered patent requiring correction as follows: Page 3, first column, line 47, for "portion 28" read --portion 29--; page 5, first column, line 57-58, claim 10, after "support" insert --, a locking element mounted on said support--; and second column, line 31, claim 14, for "cooperaitve" read --cooperative--; page 6, second column, line 44, claim 25, for "aand" read --and--; and that the said Letters Patent should be read with this correction therein that the same may conform to the record of the case in the Patent Office.

Signed and sealed this 25th day of April, A. D. 1944.

Leslie Frazer

(Seal)                      Acting Commissioner of Patents.